(No Model.) 2 Sheets—Sheet 1.

C. RACH.
APPARATUS FOR BREWING.

No. 493,342. Patented Mar. 14, 1893.

FIG. 1.

WITNESSES
Virginia Wiley.
Julius Taylor.

INVENTOR
Carl Rach
By Francis W. Parker,
ATTORNEY (No Model.) 2 Sheets—Sheet 2.
C. RACH.
APPARATUS FOR BREWING.

No. 493,342. Patented Mar. 14, 1893.

WITNESSES
Virginia Meley
Julius Taylor.

INVENTOR
Carl Rach
By Francis W. Parker,
ATTORNEY

United States Patent Office.

CARL RACH, OF CHICAGO, ILLINOIS.

APPARATUS FOR BREWING.

SPECIFICATION forming part of Letters Patent No. 493,342, dated March 14, 1893.

Application filed February 12, 1892. Serial No. 421,341. (No model.)

*To all whom it may concern:*

Be it known that I, CARL RACH, a subject of the King of Prussia, residing at Chicago, Cook county, Illinois, have invented a new and useful Improvement in Apparatus for Brewing, of which the following is a specification.

Figure 2:
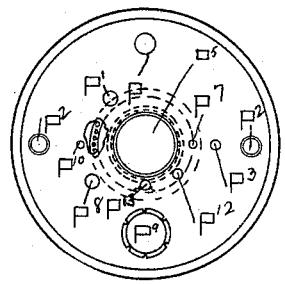
Figure 3:
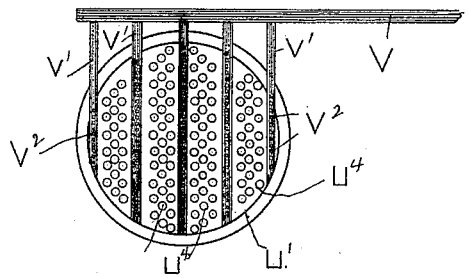
Figure 4:
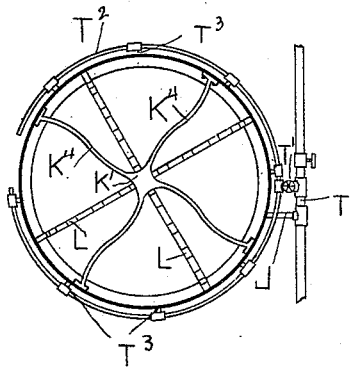

My invention relates to apparatus for brewing and has for its object to provide cheap, simple and convenient means for brewing. It is illustrated in the accompanying drawings wherein Figure 1 is a part sectional view of the kettle and condenser showing their relations. Fig. 2 is a plan view of the kettle. Fig. 3 is a detail view of the interior of the condenser. Fig. 4 is a cross section through the bottom of the kettle.

Like parts are indicated by the same letter in all the figures.

A is a kettle having the lower steam jacket B concave in shape. The cylindrical portion of the kettle is connected to the bottom in the usual manner by flanges and also to the top C in the same manner.

D is a horizontal-stirrer shaft passing through the steam jacket and into the lower part of the kettle through the stuffing box E. F and F' are gears whereby the shaft D is driven the latter on the shaft $F^2$ carrying the pulleys $F^3$ $F^4$, which are in turn belted by the belts $F^5$ $F^6$ to the pulleys $F^7$ $F^8$. This stirrer shaft is supported in any desired or proper manner as on the pillow block D'.

G is a discharge pipe passing up through the steam jacket to the inside of the kettle and adapted to discharge waste water and the like, and H is a pipe similarly opening into the kettle and provided with a valve H' connected with the lever $H^2$, rod $H^3$ and handle $H^4$ whereby said discharge valve may be controlled.

J is a steam inlet pipe opening into the steam jacket.

J' is a steam outlet pipe opening from the jacket.

$J^2$ is a safety plug in the steam jacket. By this means steam may be introduced to or discharged from the steam jacket and the same is protected by a steam plug or valve if the latter should be used. The waste water from the interior of the kettle may be discharged as also the contents thereof may be withdrawn from substantially the lowest point in the kettle. Within this kettle is the horizontal frame K having the central hub K' supported on the shaft D and with laterally extending arms $K^4$ $K^4$ riveted at their outer ends to the kettle and each having downwardly projecting teeth $K^5$ $K^5$ which engage or from time to time receive notches in the outwardly extending radial arms L L which are secured at their inner ends to the upper portion of the sleeve $K^2$ which is secured as by set screws to the shaft so as to rotate therewith. It is immaterial whether the arms K or the arms L revolve and the construction may be made so as to revolve either, but I have shown the arms L L as adapted to revolve and the arms $K^4$ $K^4$ to remain fixed. Transversely through the kettle extends the shaft M having the radial stirring arms M' and provided with the stuffing boxes $M^2$ $M^2$. This shaft is driven by the pulley $F^7$.

N is a large pipe passing downwardly through the stuffing box N' in the top of the kettle and adapted to be raised or lowered by means of a rack $N^2$ and hand pinion $N^3$. This pipe extends to near the horizontal stirrers or may be elevated as desired. To permit this vertical adjustment of the pipe N it may be made in two sections united by a telescopic joint, as shown at $N^5$. The top of the kettle is provided with sundry apertures for various purposes as indicated in Figs. 1 and 2.

O is a pipe controlled by the valve O' opening into the head $O^2$, and $O^3$ is a similar pipe controlled by the valve $O^4$ and opening into said head. This head opens through the aperture $O^5$ into the kettle.

P is the malt inlet aperture or pipe.

P' is a hot or cold water inlet or pipe.

$P^2$ $P^2$ are glass lenses by means of which the interior may be seen.

$P^3$ is a steam inlet pipe connected with the steam pipe $P^4$ and provided with the safety blow-off $P^5$.

$P^6$ is a pressure gage attached at aperture $P^7$.

$P^8$ is the aperture for the pipe N.

$P^9$ is a man hole. $P^{10}$ is an aperture for the thermometer $P^{11}$ which projects far into the kettle.

$P^{12}$ is the aperture for the vacuum gage and $P^{13}$ for the pipe leading to the sparger in the upper interior part of the kettle.

R is the vacuum gage and R' the sparger.

S is a pipe leading from the discharge valve H' to the mash tub S', and $S^2$ is a similar pipe branching from the pipe S and leading to the mash tub or hop jack of the brew house $S^{11}$.

T is the main steam or compressed air pipe from which a short pipe T' connects with the circular pipe $T^2$ which passes about the kettle and from which a series of short pipes $T^3$ open into the kettle. From this pipe passes downwardly the pipe J which finally leads to the steam jacket. From it also leads the pipe $P^4$ into which opens the air discharge pipe $T^4$. The pipe O leads to a head U which opens into the condenser U' having the lower concave portion $U^2$ and an upper concave portion $U^3$. The three parts of the condenser are connected by flanges as in the case of the kettle. Vertically through the condenser passes a series of pipes $U^4$ $U^4$ surrounded preferably by cold water.

V is an inlet pipe having the branch pipes V' V' which pass into the lower portion of the condenser and are provided each along its length with a series of apertures $V^2$ $V^2$.

$V^3$ is a water outlet pipe at the top of the condenser. $V^4$ is a pipe leading from the bottom to the pipe $V^5$ which leads to a vacuum pump $V^6$.

$V^7$ $V^8$ are the fast and loose pulleys of the pump.

The various parts of the kettle and condenser may be made of such material as may be found most suitable and many of the features here described might be dispensed with without materially affecting the mode of operation of the remaining features. The relation of parts is also susceptible of considerable variation without departing from the spirit of my invention. Neither do I desire to limit myself to the specific method or means for transmission of power from one part to another.

My apparatus is susceptible of widely extended and greatly varying use in connection with the various processes employed in mashing and beer making and the like. The devices shown may be used as a beer making apparatus, a mashing apparatus, steam cooker, pressure kettle, vacuum kettle, or sterilizing apparatus.

When the apparatus is to be used as a beer kettle (referring now to the kettle proper) the valve O' is closed and $O^3$ is opened and steam is let into the steam jacket, the kettle being supplied with suitable materials. In this condition the contents of the kettle are heated properly by means of the steam in the steam jacket while through the open pipe $O^3$ the kettle is opened to the atmosphere.

If the kettle is to be used as a mashing kettle the mash material is brought into the kettle from the mash tub through the pipe S and it may be brought through the pipe N. If it enters through the pipe N it may do so by gravity the said pipe N being connected with some mash tub situated higher than the kettle, but if it is brought in through the pipe S the same being connected with a mash tub situated lower than the kettle it is done by creating a vacuum or partial vacuum in the kettle. To make such vacuum it is only necessary to close the valve $O^4$ and open the valve O' and operate the vacuum pump $V^6$ which will exhaust the kettle through the condenser. The mash material in the kettle may then be heated properly by means of the steam in the steam jacket or by direct application of steam entering through the pipes T T' $T^2$ and $T^3$.

If the kettle is to be used as a steam vessel or cooker a suitable quantity of water is supplied to the kettle through the water pipe which is connected with the aperture P'. A proper quantity of malt is also poured in through the pipe connected with the aperture P. The power is then applied and one or both of the stirring devices set in operation and the mashing process is continued a suitable length of time. Steam is admitted to the the steam jacket as before and at the same time is discharged into the mash through the pipes connected with the circular pipe. By this process the contents of the kettle are gradually heated by the direct application of steam and also by the heat in the steam jacket. When the mash is in its proper condition, as for example, boiling, all the valves are closed except the valve of the discharge pipe $T^4$ which is opened slightly and the pressure in the kettle is raised from twenty to thirty-five pounds and kept at this pressure by the application of heat until the whole mash is thoroughly converted. The contents of the kettle are then discharged into the mash tubs by opening the valves in the pipes H S $S^2$ or N, the pressure within the kettle causing such discharge.

The use of the kettle as a pressure kettle is substantially the same as last above described except that a pressure of fifteen pounds only is used and all valves are closed except the valve of the discharge pipe $T^4$.

When the kettle is being used as a vacuum kettle the process is as hereinbefore described by means of exhaustion through the vacuum pump $V^6$. This exhaustion is employed when the contents of the kettle have reached the right stage and is carried on until a suitable vacuum is secured. In the mean time the stirrer apparatuses in the kettle are operated as before and to the desired degree.

When used as a sterilizing apparatus the contents of the kettle may be first cooked at the atmospheric pressure by opening the valve $O^4$, and then by closing the valves $O^4$ O', at any desired pressure. The contents are then cooled off by means of compressed filtered air discharged into the kettle through the pipes T T' and the circular and radial pipes surrounding the bottom of the kettle. The condenser in all operations where the vacuum apparatus is employed serves by the condensation of the steam in the substance passed through the pipes to assist in the creation of a vacuum.

I claim—

1. The combination of a kettle with pipes and controlling valves adapted to connect the same with the atmosphere or with a vacuum pump, a vacuum pump thus connected with the kettle, suitable controlling valves and means for heating the contents of the kettle so that the same may be heated to any desired degree at atmospheric pressure or above or below the same.

2. The combination of a kettle with pipes and controlling valves adapted to connect the same with the atmosphere or with a vacuum pump, a vacuum pump thus connected with the kettle, suitable controlling valves and means for heating the contents of the kettle so that the same may be heated to any desired degree at atmospheric pressure or above or below the same said stirring devices consisting of a lower horizontal stirrer and a transverse vertically acting stirrer and means for driving the same.

3. The combination with a kettle having a valved communication with the external air, steam pipes leading into the said kettle at the top and at about the bottom thereof, a steam jacket and steam pipe adapted to discharge so that the contents of the kettle may be heated by means of the steam jacket or by direct application of steam or both, pipes and valves whereby the kettle may be connected with a vacuum apparatus, and a vacuum apparatus so connected with such kettle that the contents thereof may be heated either at, above or below atmospheric pressure.

4. The combination with a kettle, of an inlet and discharge pipe having a vertically movable section extending through the shell of the kettle, and hand operated devices situated outside of the kettle for raising and lowering the same, whereby the contents of the kettle may be exhausted at various points within the kettle, and whereby it may be filled, by one pipe.

5. The combination of a kettle with a vertically movable inlet and discharge pipe and hand operated devices situated outside of the kettle for raising or lowering the same whereby the contents of the kettle may be exhausted at various points within the kettle and whereby it may be filled. by one pipe.

CARL RACH.

Witnesses:
LAURA V. WILLEY,
WALTER J. GUNTHORP.